United States Patent [19]

Antonelli et al.

[11] Patent Number: 5,010,140

[45] Date of Patent: Apr. 23, 1991

[54] PROCESS FOR PREPARING STABILIZED POLYMER DISPERSION

[75] Inventors: Joseph A. Antonelli, Riverton, N.J.; Christopher Scopazzi, Wilmington, Del.; Mark M. Doherty, Utica, Mich.

[73] Assignee: E. I. Du Pont de Nemours and Company, Wilmington, Del.

[21] Appl. No.: 363,272

[22] Filed: May 31, 1989

[51] Int. Cl.[5] .......................... C08F 2/14; C08F 4/60; C08F 265/06

[52] U.S. Cl. .................................. 525/269; 525/268; 525/285; 525/286; 525/288; 525/293; 525/301; 525/308; 525/309

[58] Field of Search ............................... 525/269, 268

[56] References Cited

U.S. PATENT DOCUMENTS

| | | | |
|---|---|---|---|
| 4,493,914 | 1/1985 | Chattha | 523/436 |
| 4,680,352 | 7/1987 | Janowicz et al. | 526/329.7 |
| 4,694,054 | 9/1987 | Janowicz | 526/329.7 |
| 4,722,984 | 2/1988 | Janowicz | 526/123 |
| 4,746,714 | 5/1988 | Spinelli et al. | 525/286 |

FOREIGN PATENT DOCUMENTS 53-009847 8/1978 Japan.
87/03605 6/1987 World Int. Prop. O..

*Primary Examiner*—John C. Bleutge
*Assistant Examiner*—Vasw S. Jagannathan
*Attorney, Agent, or Firm*—Hilmar L. Fricke

[57] ABSTRACT

Stabilized polymer dispersions in which the principal polymer contains a core component of acrylic polymers and stabilizer components which are polymers of ethylenically unsaturated monomers and which are grafted to the core component at the stabilizer ends, can be prepared using a catalytic chain transfer agent containing $Co^{+2}$.

6 Claims, No Drawings

PROCESS FOR PREPARING STABILIZED POLYMER DISPERSION

TECHNICAL FIELD

This invention relates to a process for preparing a stabilized polymer dispersion. It is more particularly directed to a process for preparing a dispersion of a polymer having an acrylic polymer core component and a polymeric stabilizer component, in which the stabilizer component is prepared using a cobalt catalytic chain transfer agent.

BACKGROUND AND SUMMARY OF THE INVENTION

The stabilized polymeric dispersions prepared according to this invention are described in a general way in U.S. Pat. No. 4,746,714 to Spinelli, Scopazzi and Antonelli.

While those dispersions function very well for their intended purpose, the method described for their preparation provides no convenient way for incorporating living functional groups, especially hydroxyl groups, on the chains of the stabilizer polymer molecules. These functional groups confer certain advantages when the polymer system is to be cross-linked with melamines or isocyanates.

It has now been found that such groups can be easily incorporated on the stabilizer polymer molecules, in any number, if one uses a cobalt catalytic chain transfer agent in the polymer's preparation.

DETAILED DESCRIPTION

The principal polymers of the dispersions prepared according to the invention are described in U.S. Pat. No. 4,746,714, previously mentioned. That description, and the disclosures of how the polymers are prepared, are incorporated into this specification. The polymers described there have core components of acrylic polymers and substantially linear acrylic polymeric stabilizer components, each having a terminal polymerizable functional group, which are grafted to the core component at one end of the chain.

Illustrative of monomers which can be used to prepare the core components are those shown in the '714 patent, column 3, line 55, to column 4, line 25. Isocyanate, silane and amine functional monomers can also be used. Preferred for use in the process of the invention are methyl methacrylate, hydroxyethyl methacrylate, methacrylic acid, methyl acrylate, styrene and glycidyl methacrylate.

The monomers used to prepare the stabilizer component according to the invention can be any of the conventional polymerizable ethylenically unsaturated monomers. Preferred for use are butyl methacrylate, isobutyl methacrylate, 2-ethylhexyl methacrylate, hydroxyethyl methacrylate, methyl methacrylate, glycidyl methacrylate, itaconic acid or anhydride, maleic acid or anhydride, styrene, isocyanatoethyl methacrylate, benzene 1-(1-isocyanato-1-methyl ethyl)-3, 4(1-methyl ethenyl), methacrylic acid, acrylic acid, silanes and amines.

The ratio of monomer units in the final polymer is a matter of choice, as will be understood by those skilled in this art.

The catalytic chain transfer agent used in the process of the invention can be any compound which contains $Co^{+2}$. Cobalt chelates are preferred, especially those described in U.S. Pat. No. 4,680,352 to Janowicz and Melby, and U.S. Pat. No. 4,722,984 to Janowicz. Most preferred are pentacyanocobaltate (II), diaquabis(borondifluorodimethylglyoximato)cobaltate (II) and diaquabis(borondifluorodiphenylglyoximato)cobaltate (II).

The chain transfer agents are ordinarily used at concentrations of 5–150 ppm based on monomers.

The process is run in two steps, the second of which can be run immediately after the first but which is ordinarily run after a pause for analysis and to permit more efficient use of the reactor.

In step one, a mixture of stabilizer monomers and organic liquid is heated, preferably to reflux temperature for ease of control, and to it is added the catalytic chain transfer agent of choice, additional monomer(s) and solvent, and the usual amount of a conventional polymerization initiator such as azo- or peroxide initiators. The reaction is run, with additions of monomers and initiator as needed, until the desired stabilizer component is obtained (ordinarily having a $M_w$ of 5000–12000).

In step two, an organic liquid which is a solvent for the stabilizer component but a non-solvent for the core component is added to the product of step one. "Solvent" and "non-solvent" are being used in the conventional sense, as will be understood by those skilled in the polymer art. Illustrative of organic liquids which can be used are aromatic- and aliphatic hydrocarbons such as heptane and VM&P naphtha. Mixtures of liquids can also be used. The stabilizer/liquid ratio is of secondary importance, but is usually in the range ¼ to ½ (weight).

The resulting mixture is again heated, preferably to reflux temperature for better control and to it are added the core monomers and a conventional initiator such as one of those previously mentioned, in the usual amount. Polymerization is continued, with additions of liquid and initiator as needed, until it is complete, as determined by periodic sampling and analysis.

The dispersions prepared according to the process of the invention can be used to modify the rheology and/or the physical properties of conventional coating compositions at concentrations of 1–80%, preferably 10–40%, by weight of the total composition.

EXAMPLES

Those skilled in the art will be able to practice this invention more easily after referring to the following illustrative examples.

Those artisans will no doubt be able to compose numerous variations on the themes disclosed, such as changing the amounts of ingredients slightly but insignificantly from those shown, adding innocuous substances, or substituting equivalent or nearly equivalent components for those shown. All such variations are considered to be within the inventive concept.

In the examples, all parts are by weight unless indicated otherwise.

EXAMPLE 1

Part A

To a reaction vessel were charged

| | |
|---|---|
| Toluene | 827.2 parts |
| n-butyl methacrylate | 447.9 |
| 2-Ethylhexyl methacrylate | 588.9 |
| 3-methacryloxypropyl- | 108.1 |

-continued

| | |
|---|---|
| trimethoxysilane (A-174) | |

This mixture was brought to reflux temperature, held there under nitrogen with stirring, and to it was then added, over a ten-minute period, a solution of

| | |
|---|---|
| 1,1'-azobis(cyclohexane-carbonitrile) (initiator) | 1.14 parts |
| Diaquabis(borondifluoro-dimethylglyoximato)-cobaltate(II) | 0.023 |
| n-butyl methacrylate | 80.7 |
| Toluene | 42.1 |

The reaction mixture was then held at reflux temperature, with stirring, and to it was added, over a 60-minute period, a mixture of

| | |
|---|---|
| n-butyl methacrylate | 209.0 |
| 2-ethylhexyl methacrylate | 271.6 |
| A-174 (described above) | 63.6 |
| Initiator | 1.95 |

This was followed immediately by the addition of a solution of

| | |
|---|---|
| n-butyl methacrylate | 209.0 parts |
| 2-ethylhexyl methacrylate | 304.9 |
| A-174 (described above) | 63.0 |
| Initiator | 2.12 |
| Toluene | 84.4 | over a 180-minute period while maintaining reflux temperature. The reaction mixture was then held at reflux temperature, with stirring, for 30 minutes after which time was added, over a 60-minute period, a mixture of

| | |
|---|---|
| Toluene | 105.9 parts |
| Initiator | 0.5 |

This reaction mixture was held at reflux temperature for 60 minutes, and toluene (246.3 parts) was then added to it and the mixture cooled. The resulting solution, 64.2% solids, contained the stabilizer component 2-EHMA/IBMA/A-174 50/40/10.

Part B
To a reaction vessel were charged

| | |
|---|---|
| Product of (A) | 265.0 parts |
| Heptane | 396.0 |

This mixture was brought to reflux temperature and to it were then added 0.6 parts of t-butyl peroctoate. The mixture was then held at reflux temperature and to it were immediately and simultaneously added, over a 210-minute period,
(1) A solution of

| | |
|---|---|
| Methyl methacrylate | 207.9 parts |
| Methyl acrylate | 103.9 |
| Styrene | 62.4 |
| A-174 | 41.6 |
| Heptane | 19.3 |
| Product of A | 128.8 |

-continued

| | |
|---|---|
| and | |

(2) A solution of

| | |
|---|---|
| Heptane | 67.7 |
| t-butyl peroctoate | 6.2 |

The resulting mixture was held at reflux temperature for 45 minutes, and to it was then added, over a 30-minute period, at reflux, a solution of

| | |
|---|---|
| Heptane | 24.7 parts |
| t-butyl peroctoate | 4.1 |

This was again held at reflux temperature for 60 minutes, and 119.7 parts of solvent were boiled off to give a dispersion containing 55% solids.

The composition of the principal polymer in the resulting product was

| |
|---|
| BMA/2-EHMA/A-174/MMA/MA/STY |
| 14.4/18.8/9.9/31.6/15.8/9.5 |

EXAMPLE 2

Part A
To a reaction vessel were charged

| | |
|---|---|
| Toluene | 853.5 parts |
| Isobutyl methacrylate | 495.2 |
| 2-ethylhexyl methacrylate | 434.2 |
| Hydroxyethyl methacrylate | 151.5 |

The mixture was brought to reflux temperature (129° C.), held there under nitrogen when stirring, and to it was then added, over a 10-minute period, a solution of

| | |
|---|---|
| Diaquabis(borondifluoro-dimethylglyoximato)-cobaltate II | 0.033 parts |
| 1,1'-azobis(cyclohexane-carbonitrile) (initiator) | 1.0 |
| Hydroxyethyl methacrylate | 36.6 |
| Toluene | 38.0 |

The reaction mixture was held at reflux temperature with stirring and to it was added, over a 240-minute period, a mixture of

| | |
|---|---|
| Isobutyl methacrylate | 353.1 parts |
| 2-ethylhexyl methacrylate | 414.0 |
| Hydroxyethyl methacrylate | 213.8 |
| Toluene | 76.3 |

The reaction mixture was then held at reflux temperature with stirring for 30 minutes, after which time was added, over a 60-minute period, a mixture of

| | |
|---|---|
| Toluene | 227.9 parts |
| Initiator | 0.9 |

The reaction mixture was further held at reflux temperature for 60 minutes and then cooled. The resulting solution, 63.6% solids, contained the stabilizer component 2-EHMA/IBMA/HEMA 40/40/20.

Part B

To a reaction vessel were charged

| Product of A | 639.2 parts |
|---|---|
| Isopropanol | 44.0 |
| Petroleum naphtha | 62.8 |
| Heptane | 790.6 |
| Xylol | 99.1 |

The mixture was brought to reflux temperature (29° C.) and to it were added 1.6 parts of t-butyl peroctoate. The reaction mixture was held at reflux temperature and to it were immediately and simultaneously added, over a 210-minute period, (1) a solution of

| Methacrylic acid | 42.2 parts |
|---|---|
| Hydroxyethyl-acrylate | 264.7 |
| Methyl methacrylate | 370.3 |
| Methyl acrylate | 190.6 |
| Styrene | 158.9 |
| Glycidyl methacrylate | 32.2 |
| Xylol | 49.1 |
| Product of A | 320.9 | and (2) a solution of

| Petroleum naphtha | 157.0 parts |
|---|---|
| Butanol | 27.9 |
| t-butyl peroctoate | 15.9 |

The reaction mixture was then held at reflux temperature for 45 minutes and to it was then added, over a 30-minute period, at reflux, a solution of

| Butanol | 62.8 parts |
|---|---|
| t-butyl peroctoate | 10.4 |

The reaction mixture was held at reflux temperature for a further 60 minutes, at which time 304.8 parts of solvent were boiled off, to give a dispersion containing 55% solids.

The composition of the principal polymer in the resulting product was

IBMA/2EHMA/HEMA/MMA/MA/S/MAA/GMA 29.7/29.7/12.8/13/6.7/5.5/1.5/1.1

The pentacyanocobaltates (II) and diaquabis(borondifluorodiphenylglyoximato)cobaltate (II) can replace the diaquabis(borondifluorodimethylglyoximato)cobaltate (II) catalytic chain transfer agent in the foregoing procedures, in equivalent amounts, with substantially the same result.

What is claimed is:

1. A process for preparing a stabilized polymer dispersion in an organic liquid in which the principal polymer comprises
   (a) a plurality of stabilizer components which are polymers of one or more ethylenically unsaturated acrylic monomers, and
   (b) a core component composed of acrylic polymers; substantially all of the stabilizer components being grafted to the core component at one of the stabilizer ends, the process comprising the following steps:
   (a) preparing the stabilizer component by polymerizing one of more ethylenically unsaturated acrylic monomers at least one of said monomers containing a reactive functional group, using a catalytic chain transfer agent containing $Co^{+2}$ to form a stabilizer component having an ethylenically unsaturated terminal group and at least one reactive functional group,
   wherein the reactive functional group is selected from the group consisting of carboxyl, hydroxy, anhydride, isocyanate amine or silane, and then
   (b) preparing the core component by polymerizing one or more acrylic monomers while they are in contact with stabilizer components,
   steps (a) and (b) being conducted in an organic liquid which is a solvent for the stabilizer components but a non-solvent for the core component.

2. The process of claim 1 in which the chain transfer agent is a colbalt$^{30\ 2}$ chelate.

3. The process of claim 2 in which the chelate is a pentacyanocobaltate (II), diaquabis(borondifluorodimethyl-glyoximato)cobaltate glyoximato)cobaltate (II).

4. The process of any one of claims 1-3 in which the monomers used in (a) are butyl methacrylate, isobutyl methacrylate, 2-ethylhexyl methacrylate, hydroxyethyl methacrylate, methyl methacrylate, glycidyl methacrylate, styrene, methacrylic acid, acrylic acid, itaconic acid or anhydride, maleic acid or anhydride, or an isocyanate, silane or amine functional monomer.

5. The process of any one of claims 1-3 in which the monomers used in (b) are methyl methacrylate, hydroxyethyl methacrylate, methacrylic acid, styrene, glycidyl methacrylate or a silane.

6. A process according to claim 1 in which the monomers used in (a) are butyl methacrylate, isobutyl methacrylate, 2ethylhexyl methacrylate, hydroxyethyl methacrylate, methyl methacrylate, glycidyl methacrylate, styrene, methacrylic acid, acrylic acid, itaconic acid or anhydride, maleic acid or anhydride, or an isocyanate, silane or amine functional monomer, and the monomers used in (b) are methyl methacrylate, hydroxyethyl methacrylate, methacrylic acid, styrene, glycidyl methacrylate or a silane.

* * * * *